FUNCTION GENERATING MAGNETIC AMPLIFIER

Filed Nov. 27, 1961 3 Sheets-Sheet 1

INVENTOR.
DAVID L. LAFUZE
BY Lawrence G. Norris
ATTORNEY-

FUNCTION GENERATING MAGNETIC AMPLIFIER

Filed Nov. 27, 1961 3 Sheets-Sheet 2

INVENTOR.
DAVID L. LAFUZE
BY Lawrence D. Norris
ATTORNEY

INVENTOR.
DAVID L. LAFUZE
BY Lawrence G. Norris
ATTORNEY

United States Patent Office 3,229,186

Patented Jan. 11, 1966

3,229,186
FUNCTION GENERATING MAGNETIC AMPLIFIER

David L. Lafuze, Waynesboro, Va., assignor to General Electric Company, a corporation of New York
Filed Nov. 27, 1961, Ser. No. 154,959
8 Claims. (Cl. 321—18)

My invention relates to magnetic amplifiers and in particular to an improved magnetic amplifier which is capable of electrical function generation.

In certain applications, such as control systems and the like, it is sometimes necessary to provide devices which are capable of generating certain preselected characteristics between their input and output signals which are characterized by other than straight line relationships. For example, in some control systems, it is desirable to provide a relatively high gain, that is, a high output-input ratio, over a limited band of input signals, and then to provide a lower gain as the input signal exceeds a certain preselected magnitude. Or, it may be desired to provide a nonlinear output-input characteristic which may be approximated by a number of straight line segments each representing a certain gain level. This provides an output signal which is a nonlinear function of the input signal. Such devices are commonly called function generators.

My invention relates to the field of electrical function generators and has for its primary object the provision of an improved magnetic amplifier having a function generation characteristic which may be used to generate a wide variety of input-output relationships.

Briefly described, my invention, in accordance with one embodiment thereof, contemplates the provision of a magnetic amplifier which is essentially of the full wave, push pull type, together with a diode or other unidirectional impedance means in series with the load. In combination with this, I provide an additional winding on the magnetic amplifier which is coupled to drive the two sides of the full wave configuration in such a direction as to tend to reverse the firing order of one of the sides relative to that specified by the control signal input and to tend to maintain the firing order of the other side in the same sequence as specified by the control signal input.

For input signals of a relatively low magnitude, the firing order remains reversed on one side of the amplifier because of the predominant effect of the signal applied to the extra winding, which I will call the breakpoint control signal, and the effect on the load of that wave half of the amplifier is blocked by the diode. At some preselected point, however, controlled by the magnitude of the breakpoint signal, the control signal will become sufficiently large to reverse the firing order of the reversed side of the amplifier back to the direction specified by the control signal, and that half of the amplifier will then produce a signal in a direction to supply the load. At this point the gain of the amplifier will be significantly increased by reason of the operability of the additional windings to supply the load.

Thus, the gain of the amplifier will be relatively low for the smaller input signal levels and will then increase substantially for input signals of greater than the preselected magnitude which is determined by the magnitude of the breakpoint signal. In one embodiment of my invention I provide still another winding which allows the translation of this characteristic along the input control signal axis. This winding is coupled in a direction opposite to the input control signal coupling so as to allow the point at which zero output is obtained to be adjusted relative to the input signal.

In another embodiment of my invention, I provide a feedback arrangement in combination with the foregoing which provides additional flexibility in that the gain at the breakpoint signal level may be made either to increase or to decrease. It will be observed that amplifiers having this characteristic may be operated separately or may be coupled together to permit the generation of a wide variety of output-input functions.

My invention will be better understood and various other objects and advantages thereof will become apparent from the following description taken in connection with the accompanying drawings in which.

Figure 1:
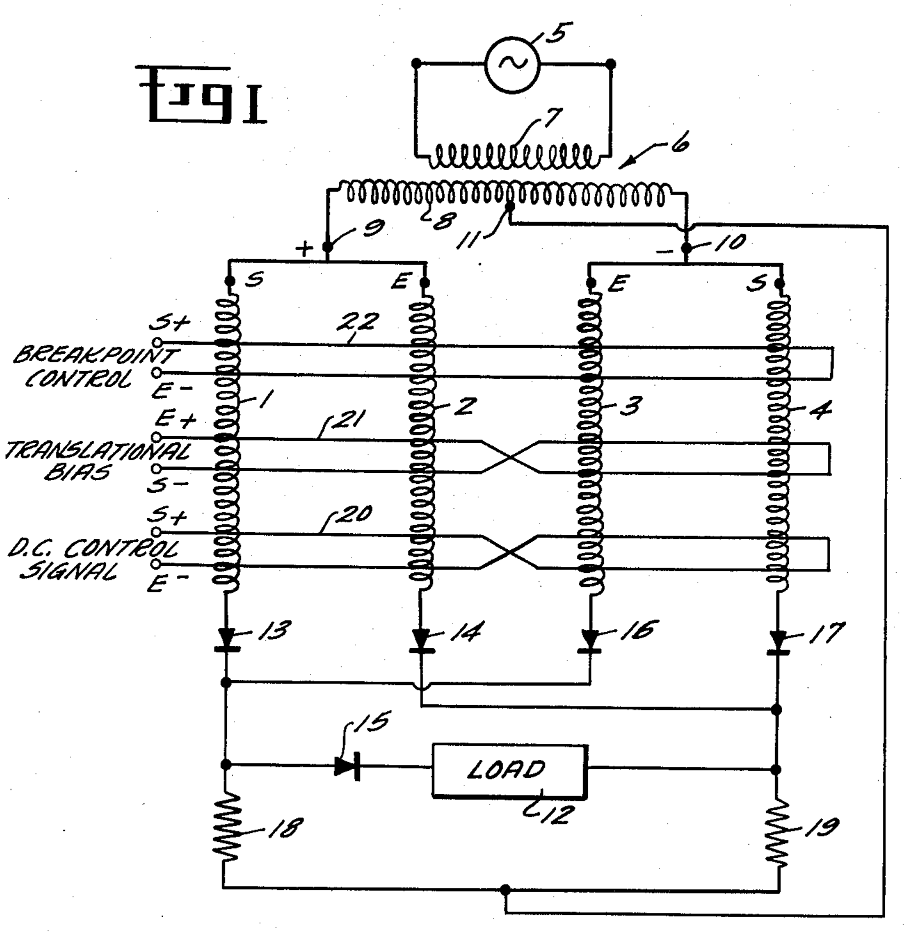
FIG. 1 is a circuit diagram of a magnetic amplifier embodying my invention.

Referring now to the embodiment of FIG. 1, I show a magnetic amplifier having gate windings 1, 2, 3 and 4 connected to be driven from an alternating current power source 5 through a center tapped transformer 6. The transformer 6 is provided with a primary winding 7 and a secondary winding 8 having output terminals 9 and 10 and a center tap terminal 11. The gate windings 1 and 2 are connected to one side of the transformer secondary at terminal 9 and the gate windings 3 and 4 are connected to the other side of the transformer secondary at terminal 10.

The gate windings 1 and 3 are connected to one side of a load 12 through diodes 13 and 16 associated respectively with the windings and a diode 15 in series with the load. The gate windings 2 and 4 are connected to the other side of the load 12 through diodes 14 and 17 as shown. Dummy resistors 18 and 19 are connected as shown to the two sides of the amplifier and back to the center tap 11 of the transformer secondary.

The amplifiers provide for three windings, a D.C. control signal input winding 20, a translational bias winding 21, and a breakpoint control winding 22. The letters S and E are used to designate "start" and "end" terminals of the various windings in order to specify the directions in which the windings are driven relative to each other. In other words, a positive signal applied as shown to the breakpoint control winding 22 drives the gate winding 1 toward saturation in the same direction as the positive signal applied to that winding at terminal 9, whereas the reverse is true in the case of gate winding 2. It will be noted also that the windings 20 and 21 are reversed between the right and left hand sides of the amplifier whereas winding 22 is not. The amplifier of FIG. 1 is biased to a suitable operating point by a bias winding, not shown, which may be connected to any suitable external or self-biasing arrangement. The operation of the amplifier in FIG. 1 will now be explained.

Assume first of all that a D.C. signal is applied to the breakpoint control winding 22 in the direction shown, but that no signals are applied to the windings 20 and 21. During the reset period of gate windings 1 and 2, this signal will set the winding 1 closer to its saturation point and will set the winding 2 further away from its saturation point. During the active half cycle, then, with the transformer secondary voltage polarity as shown, the winding 1 will fire first in the cycle, producing a wave shape 23 across the resistor 18 as shown in period I of FIG. 2. Because winding 2 must absorb a greater amount of energy before reaching saturation, it will fire later in the cycle, producing a wave shape across the dummy resistor 19, as shown at 24 in FIG. 2. The firing points of windings 1 and 2 are noted on the wave shapes 23 and 24 in FIG. 2.

The difference between the two voltage waves 23 and 24 will appear across the load 12 and the polarity will be as shown in FIG. 1; that is, in the conducting direction of the diode 15. The wave shape of the voltage appearing across the load 12, in other words, the difference between the voltage waves 23 and 24, is shown at 25 in FIG. 2.

During the next half cycle of the supply voltage 5, the polarity of the transformer secondary will be the reverse of that shown, and the windings 3 and 4 will enter their active half cycle. Now it will be observed from the circuit diagram of FIG. 1 that the breakpoint control signal applied in the direction shown will drive the winding 4 toward saturation and the winding 3 away from saturation and that these windings will have been thus reset during the active half cycle of the windings 1 and 2. Therefore, during the active half cycle of the windings 3 and 4, the winding 4 will fire first, producing a voltage wave shape as shown at 26 in FIG. 2 across the resistor 19, and the winding 3 will fire later in the half cycle, producing a voltage wave shape 27 across the resistor 18. The difference between these two voltages, which is the voltage applied across the combination of the diode 15 and the load 12, will be the voltage 28, but for this firing order the polarity will be the opposite of that shown in FIG. 1, or, in other words, in the nonconducting direction of the diode 15.

Thus, with a normal bias applied to the amplifier FIG. 1, and a D.C. signal of a preselected magnitude applied to the breakpoint control winding 22 in the direction shown, the output voltage applied to the combination of the load 12 and the diode 15 will be as represented by the voltage waves 25 and 28 for each full cycle of the supply voltage, except that current will flow through the load 12 only on the alternate half cycles when the voltage is in the direction of the voltage 25, as shown by the polarity designated in FIG. 1.

In other words, during alternate half cycles when the output voltage is in the direction represented by the voltage wave 28, current flow through the load 12 will be blocked by the diode 15.

Figure 3:
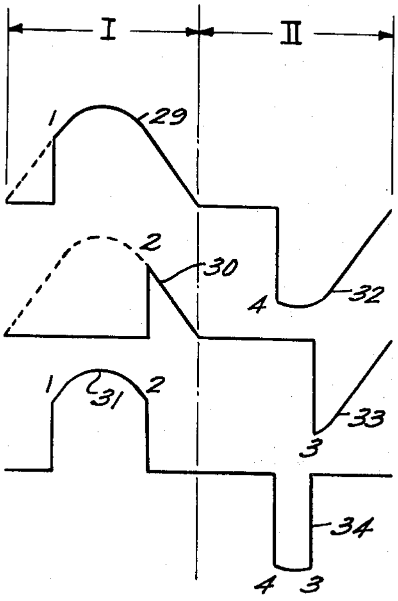
FIG. 3 shows the signal wave shapes for an input signal greater than that represented by FIG. 2, but still less than the breakpoint signal.

Now assume that with the breakpoint control signal applied to the winding 22 as just described, a D.C. control signal is applied to the input winding 20 in a direction shown in FIG. 1. This signal is in a direction to reset the windings 1 and 3 closer towards the saturation point and to reset the windings 2 and 4 further away from the saturation point. As the D.C. control signal is increased in magnitude, the output wave shapes move in the direction as represented in FIG. 3.

In other words, the winding 1 fires earlier in the cycle and the winding 2 later in the cycle, producing wave shapes as shown at 29 and 30 in FIG. 2 across the resistors 18 and 19 respectively, and producing an output voltage 31 of the same polarity as 25 but of a larger duration, thereby increasing the average current delivered to the load 12 during that half cycle. On the alternate half cycle, however, it will be observed that the winding 4 will fire later in the cycle while the winding 3 fires earlier, producing wave shapes 32 and 33 respectively across the resistors 19 and 18 and yielding an output 34 of the same polarity as 28 but of a narrower width. Because the voltage 34 is still blocked by the diode 15, however, the amplifier still remains inactive during that half cycle insofar as its ability to supply current to the load 12 is concerned, and the output therefore increases only by the increment represented by the higher average current produced by the wider output voltage wave 31.

Figure 4:
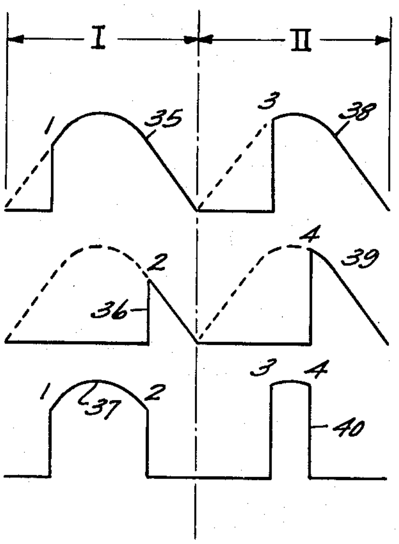
FIG. 4 shows the wave shapes of the arrangement of FIG. 1 when the control signal exceeds the breakpoint magnitude.

Now as the control signal applied to the input winding 20 continues to increase, the winding 4 will be caused to fire still later in the cycle and the winding 3 still earlier, until at some magnitude of the input control signal, the firing order of the windings 3 and 4 will be reversed, with the winding 3 then firing first and the winding 4 last. As the input control signal is increased beyond this point, the output wave shapes will then appear as represented in FIG. 4. It will be observed here that the 4–3 firing order shown in FIGS. 2 and 3 has been reversed to the 3–4 order. The wave shapes 35 and 36 produced by the windings 1 and 2 continue to remain the same except that the output 37 has increased in proportion to the increased input signal.

Because the winding 3 now fires ahead of the winding 4, however, its output 38 will be in the direction noted in FIG. 1; in other words, in the conducting direction of the diode 15. With the winding 4 firing last and producing a voltage 39, the output 40 for this half cycle will now be reversed in polarity from that previously considered and will be in the conducting direction of the diode 15.

Figure 2:
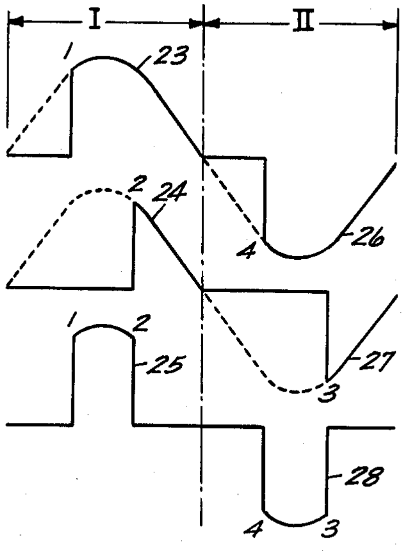
FIG. 2 illustrates the signal wave shapes for the arrangement of FIG. 1 at selected points in the amplifier typifying the condition where the input signal is less than the breakpoint magnitude.

Thus, for control signal inputs applied to the input winding 20 of a magnitude sufficiently large to reverse the firing order of the windings 3 and 4 from that represented by FIGS. 2 and 3 to that represented by FIG. 4, the increase in the output for a given increment of input control signal or, in other words, the gain in the amplifier, will be substantially increased; in fact, approximately doubled for a symmetrical amplifier system. For input signals less than the critical level, however, the output of the amplifier will be blocked by the diode 15 on alternate half cycles and the gain will accordingly remain at a correspondingly lower level.

It will be observed that for the system described thus far, an output signal is obtained with no control signal input applied to the control winding 20. This is the output 25 represented in FIG. 2. I therefore provide a translational bias winding 21 which allows adjustment of this condition. For a signal applied in the direction shown, the winding 21 is coupled to drive the cores of the gate windings in a direction opposite from that produced by the input signal applied to the winding 20. In other words, a signal applied in the direction shown to the winding 21 resets the windings 2 and 4 closer to the saturation point and resets the windings 1 and 3 further away from the saturation point.

The effect of this signal, then, during the active half cycle I of the windings 1 and 2 is to make the winding 2 fire earlier in the cycle and the winding 1 later in the cycle or, in other words, to narrow the width of the output voltage 25. During the active half cycle II of the windings 3 and 4, the winding 4 is made to fire earlier in the cycle and the winding 3 later in the cycle, thus widening the output 28 during that half cycle. It will therefore be seen that the translational bias signal can be increased to the point where, with zero input to the control winding 20, the windings 1 and 2 fire at the same point in the cycle, thus producing a zero output for a zero input control signal. A further increase in the translational bias signal reverses the firing order of the windings 1 and 2 to reverse the polarity of the output 25, thus requiring some preselected input control signal level to be achieved before the firing order is reversed back to the 1–2 order to provide a signal in the conducting direction of the diode 15. Because the translational bias signal also pushes the firing points of the windings 3 and 4 further away from each other, a larger level of input control signal must be achieved in order to reverse this firing order and reach the higher gain breakpoint.

Figure 5:
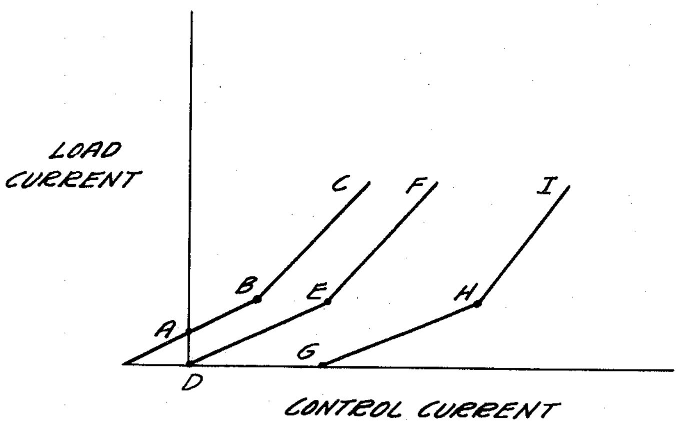
FIG. 5 is a graphical presentation of the output-input characteristics for the amplifier arrangement of FIG. 1.

The various characteristics which can be generated are shown in FIG. 5, in which the output current to the load 12 is represented as a function of the input control current in the control winding 20. The characteristic with zero translational bias is shown by the line ABC with some output current being produced at zero input control current. The breakpoint B represents the level of the input control current at which the firing order of the windings 3 and 4 is reversed and the gain of the amplifier is increased. The line DEF shows the characteristic with the translational bias adjusted to the level required for a zero-zero intercept, with the breakpoint E being correspondingly moved over to the right from the point B, and the line GHI shows the characteristic with a still higher level of translational bias where some level of input control current must be achieved to establish the 1–2 firing order sequence and produce an output, the breakpoint for this characteristic being the point H. The breakpoint, that is, the point where the 3–4 firing order is established and the gain is increased, is controlled by the magnitude of the breakpoint control signal.

Figure 6:
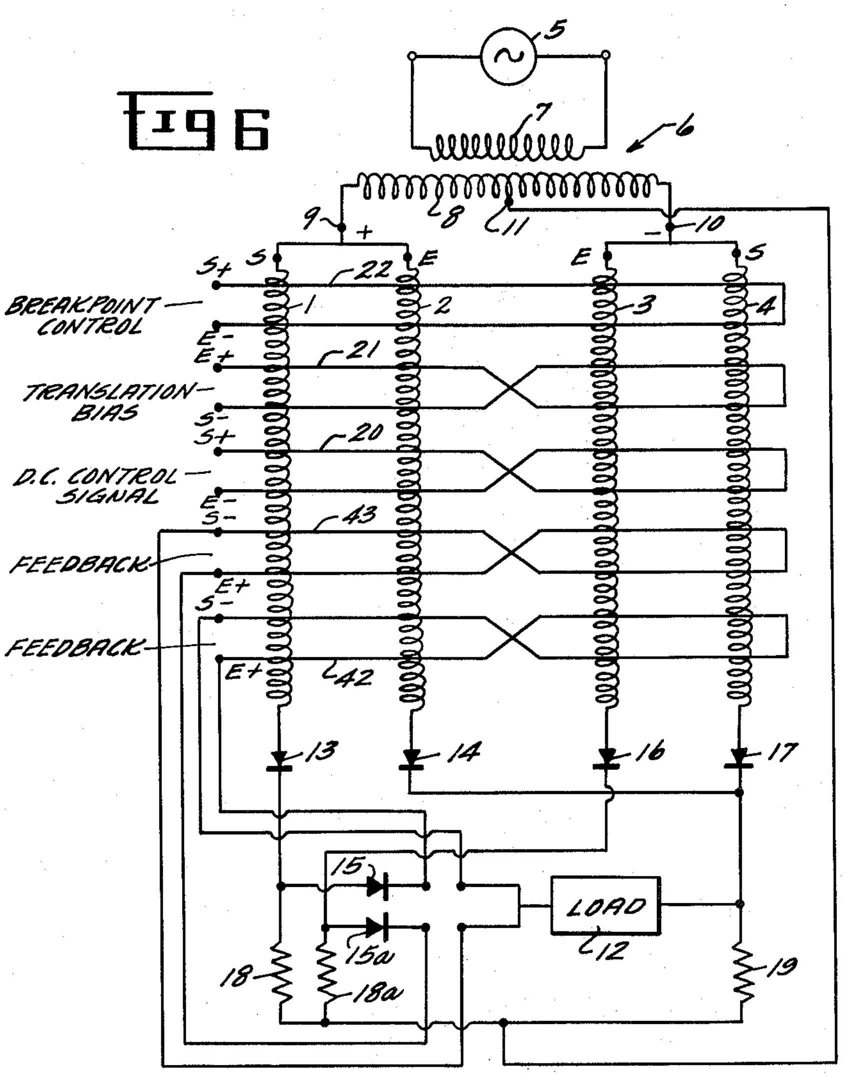
FIG. 6 is a circuit diagram of an alternative embodiment of my invention in which feedback is employed and in which provision is made to avoid interaction between the two sides of the amplifier; and, FIG. 7 is a graphical presentation of the output-input characteristics of the embodiment of FIG. 6.

Referring now to FIG. 6, I show another embodiment of my invention which is similar to that shown in FIG. 1, except that feedback is used to provide additional flexibility in that the gain may be made either to decrease or to increase at the breakpoint signal level. The basic amplifier is the same as that shown in FIG. 1 and I have used like numerals to designate like elements. In addition, the amplifier of FIG. 6 is biased to a suitable operating point by a bias winding, not shown. In addition to the other windings, two feedback windings 42 and 43 are provided. In order to avoid interactions in the feedback arrangement an additional dummy resistor 18*a* is provided and a diode 15*a* is connected to the dummy resistor 18*a* in the same manner that the diode 15 is connected to the dummy resistor 18.

Except for the feedback, the system of FIG. 6 operates in the same manner as described above in connection with the arrangement of FIG. 1. For low level control signal inputs, the 4–3 firing order is maintained and current flow through the load 12 during that half cycle is blocked by the diode 15*a*. During the alternate half cycles the 1–2 firing order produces a current flow through the load through the diode 15. The two feedback windings provide feedback during the alternate half cycles, the winding 42 being active during the half cycle of the windings 1 and 2, and the winding 43 being active during the active half cycle of the windings 3 and 4. It will be observed, however, that neither the winding 42 or 43 will product any feedback unless the polarity of the output during its respective half cycle is in the conducting direction of the diodes 15 and 15*a*.

Thus, the low signal level gain is established by the windings 1 and 2 in combination with the feedback winding 42, and the higher signal level gain which occurs at the point where the winding 3 begins to fire ahead of the winding 4 is determined by the overall combination with both feedback windings 42 and 43 active.

Now it will be observed that the feedback winding 43 is also coupled to the gate windings 1 and 2, so that when this winding becomes active the gain of that side of the amplifier will be reduced by reason of increased negative feedback. Thus, the overall gain of the amplifier can be made to either increase or decrease at the breakpoint signal level. This allows the generation of a wide variety of double sloped characteristics, some of which are shown in FIG. 7.

Figure 7:
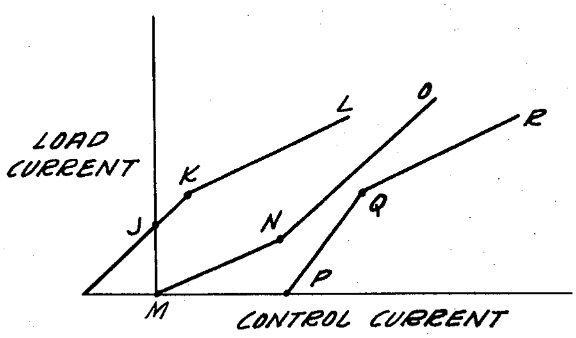

Referring now to FIG. 7, I have shown three representative kinds of double sloped characteristics that may be generated with the arrangement of FIG. 6. The characteristic JKL is typical of the case where zero or a relatively small translational bias signal is applied and where the total feedback of the windings 42 and 43 is such as to reduce the gain at the breakpoint K. The line MNO shows characteristic with the translational bias adjusted to provide a zero-zero intercept and with the total feedback being such that the gain increases at the breakpoint end. The line PQR shows a characteristic with a still higher translational bias and a feedback such as to reduce the gain at the breakpoint Q. The gain up to the breakpoint is determined by the feedback on the winding 42 and the gain beyond the breakpoint is determined by the total feedback on windings 42 and 43. The breakpoint is determined by the magnitude of the breakpoint control signal applied to the winding 22 and the horizontal position of the characteristic along the input control current axis is determined by the magnitude of the translational bias signal on the winding 21. It will be appreciated from the foregoing that my invention permits the generation of a wide variety of double sloped characteristics in a single amplifier stage. In addition, it will be appreciated that multistage arrangements can be employed to generate almost any desired multiple slope characteristic.

It should be recognized that the particular embodiments which I have selected for presentation of my invention are illustrative only and that my invention may be applied in other forms. For example, the diodes in the circuit may be replaced by unidirectional impedances of any suitable type. In addition, it will be observed that the function generating characteristic is derived primarily from combination of the unidirectional impedance means with the circuitry which provides for reversibility of the gate winding firing order as a function of the input control signal, and applications of this concept in other forms than that shown will occur to those skilled in the art. For example, a three core amplifier embodying my invention can be envisioned in which the gate windings 3 and 4 operate push-pull with only a single gate winding connected to the opposite terminal 9 of the power supply to operate in the half wave mode. The change in gain at the breakpoint where the firing order of the windings 3 and 4 is reversed would be produced in the same manner as described above, recognizing, of course, that some sacrifices in accuracy in favor of economy in this and other similarly simplified configurations might have to be made.

It will thus be apparent that various changes, modifications, and substitutions may be made in the embodiments shown without departing from the true scope and spirit of my invention as I have defined it in the appended claims.

What I claim as new and desire to secure by Letters Patent of the United States is:

1. A function generating magnetic amplifier comprising:

(a) a pair of gate windings connectible to one side of an A.-C. power supply for operation during the same alternate half cycles of said power supply, (b) means for connecting said gate windings across a load for push-pull operation, (c) said connecting means including a unidirectional impedance connectible in series with the load to oppose current flow through the load in one direction, (d) a control winding coupled in push-pull relationship to said gate windings, (e) a breakpoint control winding coupled in push-pull relationship to said gate windings in a direction opposite to that of said control winding, (f) means for connecting a breakpoint control signal to said breakpoint control winding and establishing a firing order of said gate windings producing an output in a direction opposed by said unidirectional impedance, and (g) means for connecting an input control signal to said control winding and reversing the firing order of said gate windings from that specified by said breakpoint control signal when the input control signal reaches a given strength, whereupon the output signal will be imposed on said load.

2. A function generating magnetic amplifier comprising:

(a) first and second gate windings connectible to one side of a center tapped A.-C. power supply and including means for operation during the same alternate half cycles of said power supply, (b) a third gate winding connectible to the opposite side of said A.-C. power supply and including means for operation during the opposite half cycles of said power supply when said first and second gate windings are not operative, (c) means connecting said first and second gate windings across a load for operation in push-pull during the same half cycles of said power supply, (d) means connecting said third gate winding to one side of said load for operation during opposite half cycles of said power supply, (e) a control winding coupled to said third gate winding and in push-pull relationship to said first and second gate windings, (f) a breakpoint control winding coupled in push-pull relationship to said first and second windings, (g) a unidirectional impedance in series with the load, (h) means for connecting a breakpoint control signal to said breakpoint control winding and establishing a firing order of said first and second gate windings producing an output in a direction opposed by said unidirectional impedance, and (i) means for connecting an input control signal to said control winding and reversing the firing order of said first and second gate windings from that specified by said breakpoint control signal when the input control signal reaches a given strength, whereby the output of said first and second gate windings is in the direction of the unidirectional impedance for said load.

3. A function generating magnetic amplifier as set forth in claim 2 in which said breakpoint control winding is coupled to said third gate winding in the same direction as that of said control winding.

4. A function generating magnetic amplifier as set forth in claim 3 including a translational bias winding coupled to said third gate winding in a direction opposite to that of said control winding and coupled in push-pull relationship to said first and second gate windings in a direction opposite to that of said control winding.

5. A function generating magnetic amplifier comprising:

(a) first and second pairs of gate windings, (b) said pairs of gate windings being connectible to opposite sides of a center tapped A.-C. power supply and to opposite sides of a load to operate in a full-wave, push-pull manner each of said pairs of windings having unidirectional impedance means for operation thereof during alternate half cycles of the operation of the power supply, (c) a unidirectional impedance in the output of said amplifier and connectible in series with a load to oppose current flow through the load in one direction, (d) a control winding coupled in push-pull relationship to each of said pairs of gate windings, (e) a breakpoint control winding coupled in push-pull relationship to said first pair of gate windings in the same direction as said control winding and in push-pull relationship to said second pair of gate windings in a direction opposite to that of said control winding, (f) means for connecting a breakpoint control signal to said breakpoint control winding and establishing a first firing order sequence for said first pair of gate windings and a second firing order sequence for said second pair of gate windings, (g) said second firing order sequence producing an output in a direction opposed by said unidirectional impedance, and (h) means for connecting an input control signal to said control winding and reversing the firing order sequence of said second pair of gate windings from that specified by said breakpoint control signal when the input control signal reaches a given strength whereby the output of said second pair of gate windings is in the direction of the unidirectional impedance for said load.

6. A function generating magnetic amplifier as set forth in claim 5 including a translational bias winding coupled in push-pull relationship to each of said first and second pairs of gate windings in a direction opposite to that of said control winding.

7. A function generating magnetic amplifier comprising:

(a) first and second pairs of gate windings, (b) said pairs of gate windings being connectible to opposite sides of a center tapped A.-C. power supply and to opposite sides of a load to operate in a full-wave push-pull manner each of said pairs of windings having unidirectional impedance means for operation thereof during alternate half cycles of the operation of the power supply, (c) a unidirectional impedance in the output of said amplifier and connectible in series with a load to oppose current flow through the load in one direction, (d) a control coupled in push-pull relationship to each of said pairs of gate windings, (e) a breakpoint control winding coupled in push-pull relationship to said first pair of gate windings in the same direction as said control winding and to said second pair of gate windings in a direction opposite to that of said control winding, (f) means for connecting a breakpoint control signal to said breakpoint control winding and establishing a first firing order sequence for said first pair of gate windings and a second firing order sequence for said second pair of gate windings, (g) said second firing order sequence producing an output in a direction opposed by said unidirectional impedance, (h) means for connecting an input control signal to said control winding and reversing the firing order sequence of said second pair of gate windings from that established by said breakpoint control signal when the input control signal reaches a given strength whereby the output of said second pair of gate windings is in the direction of the unidirectional impedance for said load, and (i) at least one feedback winding connected in push-pull relationship to each of said first and second pairs of gate windings and operable during the firing half cycle of said second pair of gate windings.

8. A function generating magnetic amplifier as set forth in claim 7 including a translational bias winding coupled in push-pull relationship to each of said pairs of gate windings in a direction opposite to that of said control winding.

(References on following page)

References Cited by the Examiner

UNITED STATES PATENTS

| | | | |
|---|---|---|---|
| 2,768,345 | 10/1956 | Ogle et al. | 323—89 |
| 2,795,652 | 6/1957 | Malick et al. | 323—89 |
| 2,817,770 | 12/1957 | Oppen | 323—89 X |
| 2,817,807 | 12/1957 | Weir | 323—89 |
| 2,827,603 | 3/1958 | Fingerett et al. | 323—89 |
| 2,866,016 | 12/1958 | Weiss | 323—89 |
| 3,110,857 | 11/1963 | Lafuze | 323—89 |
| 3,139,576 | 6/1964 | Lafuze | 323—89 X |

LLOYD McCULLUM, *Primary Examiner.*

ROBERT C. SIMS, *Examiner.*